Figure 4:
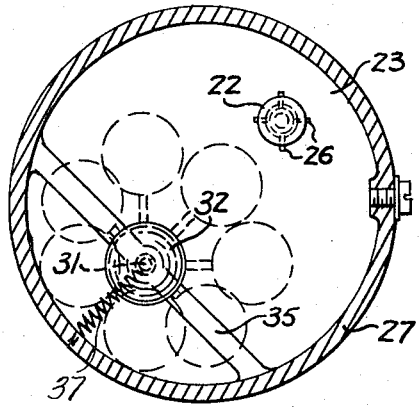

March 17, 1959 R. KRIZAN 2,877,872
DAMPING MEANS FOR VEHICLE DIP AND SWAY
Filed June 25, 1957 2 Sheets-Sheet 1
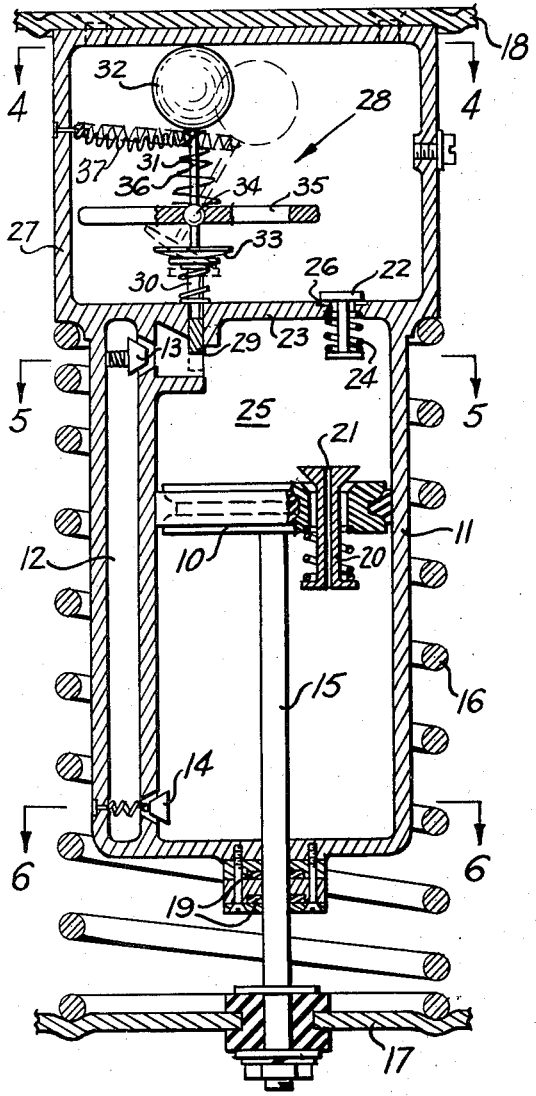
FIG. 1
FIG. 10
FIG. 2
FIG. 3
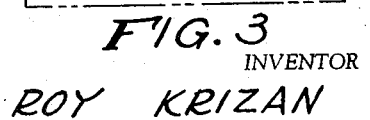
INVENTOR
ROY KRIZAN
BY
ATTORNEY March 17, 1959 R. KRIZAN 2,877,872
DAMPING MEANS FOR VEHICLE DIP AND SWAY
Filed June 25, 1957 2 Sheets-Sheet 2

INVENTOR
ROY KRIZAN
BY Walter S. Pawl
ATTORNEY

United States Patent Office 2,877,872
Patented Mar. 17, 1959

2,877,872

DAMPING MEANS FOR VEHICLE DIP AND SWAY

Roy Krizan, Chicago, Ill.

Application June 25, 1957, Serial No. 667,851

10 Claims. (Cl. 188—88)

This invention relates to damping devices for reducing vehicle dip and sway, so as to improve roadability as well as ridability.

It has been recognized that dip (which is intended to include both dive, as in stopping, and squat, as in starting) and side sway are the causes not only of discomfort to the riders but also of poor traction, when the vehicle is starting or stopping rapidly or negotiating a sharp turn.

There are certain deficiencies in the present day art of spring and shock absorber designs on motor vehicles, namely a compromise between good ridability and good roadability such that to improve one of these qualities causes the other to suffer, since it has heretofore been difficult to obtain both of these mentioned qualities at the same time, I have approached the problem by improving ridability at a time when roadability is not so necessary, namely when a car travels at a constant speed in a straight course. At another time when roadability is more important, namely when a car is accelerating, decelerating or turning, an automatic damping occurs to increase traction as will be shown in a diagram. This damping will be somewhat detrimental to the riding quality but no worse than present day systems produce, because this damping of upward wheel movement is common practice today and effective at all times.

Another deficiency of known devices in the art of using pendulum weights is the limited operation of these weights in one plane only. Therefore, all existing inertia means to my knowledge can either reduce dip in fore or aft only, or reduce swide sway only. My invention uses a pendulum that can swing in a ball and socket joint to reduce dip or sway or both at the same time.

A further object is to provide simple fluid shock absorber means with acceleration responsive check valve controls at the four corners of the vehicle in a manner to automatically reduce the effects of dip and sway and improve roadability.

A further object is to provide a shock absorber at each wheel of a vehicle having resilient suspension means for each of said wheels, each shock absorber having sensitive means for automatically damping any actuation resulting from acceleration of the vehicle, sprung weight in relation to unsprung weight, in the direction of the wheel at which said shock absorber is located, said damping being proportional to said acceleration, so as to reduce the bad effects of acceleration of the vehicle in any direction, on its riding qualities and roadability.

A further object is to combine fluid shock absorber means of simple construction with individual coil spring suspension means for the wheels of a vehicle and provide each shock absorber with sensitive but fool-proof choke valve controls responsive to accelerations of the vehicle toward said shock absorber to dampen the actuation of said shock absorber in accordance with the magnitude of said acceleration, for reducing dip and sway as well as improving roadability.

A further object is to obtain these improvements by providing a fluid shock absorber in the suspension means at each wheel of the vehicle, which normally, traveling in straight line and constant speed, presents no resistance to downward movement of the vehicle body with respect to the unsprung undercarriage and corresponding wheel, but damps its rebound or return movement, and restricting the fluid flow in said shock absorber to provide increasing resistance to said downward movement of the sprung weight in response to increased acceleration of said vehicle body in the direction of said wheel.

A further object is to arrange a valve controlled port to provide this flow restriction at one end of said shock absorber, and to control said valve by a simple pendulum lever and disc cam universally mounted in a ball and socket joint excentrically located in a vertical cylinder casing at said end of the shock absorber and normally vertically retained by light resilient means for closing said valve in proportion to the displacement of said pendulum from the vertical, the excentricity of said universal mounting being diagonally toward the center of said vehicle, whereby the pendulum is more limited in its displacements toward said center than away from it in accordance with its normal excentric clearance from the cylindrical wall of said casing.

A further object is to provide this valve controlled port in the upper end of the fluid chamber of said shock absorber and extend the valve stem through said end, providing spring means to normally hold said valve outwardly in fully open position, the universal pendulum lever mounting being spaced outwardly therefrom with the disc cam adjacent the end of the valve stem for closing the valve in accordance with the pendulum displacement from its normal vertical position.

A further object is to provide this valve and pendulum control at the upper end of said shock absorber, and to hang an expansion coil spring loosely between the upper end of said pendulum lever and the adjacent cylindrical casing wall for counteracting the force of gravity of said pendulum in its more displaced positions outwardly from the center of the vehicle.

A further object is to mount these shock absorbers within the individual wheel suspension coil springs, with each piston rod extending through the lower end of the shock absorber, and provide a relief valve in the upper end wall of the fluid chamber for relieving the fluid pressure therein due to the displacement by the piston rod in the closed fluid system of the shock absorber upon downward movement of the vehicle body, said relief valve being vented to permit return of the fluid from the cylindrical casing which serves also as a reservoir for an extra supply of the fluid to replenish any fluid in the fluid system that might gradually seep out through the piston rod packing at the bottom of the shock absorber.

A further object is to use external wiping rings in the piston rod packing to reduce friction, wear and fluid seepage to a minimum, and thus extend servicing requirement periods.

Figure 5:
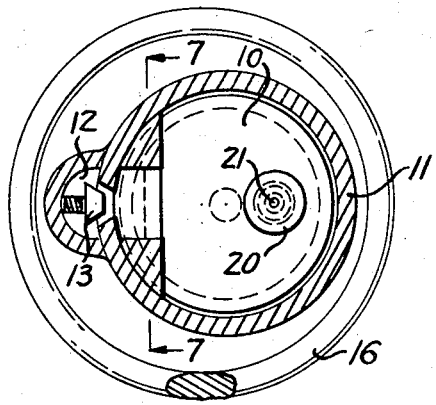
Figure 6:
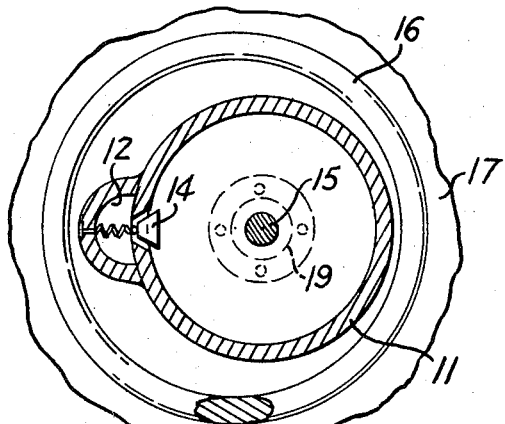
Figure 7:
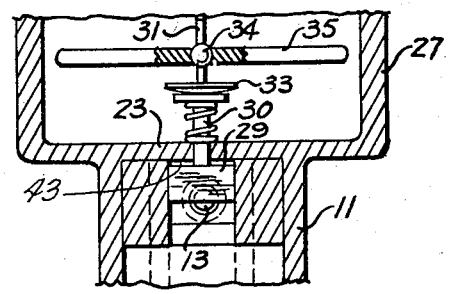
Figure 8:
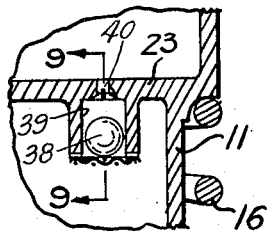
Figure 9:
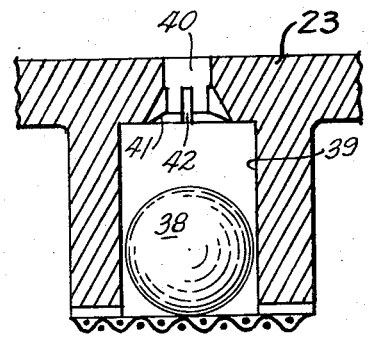

Other and more specific objects will become apparent in the following detailed description of a preferred form of the invention as illustrated in the accompanying drawings, wherein Fig. 1 is a sectional view in elevation of an individual coil spring suspension unit equipped with a hydraulic fluid shock absorber in accordance with the present invention, Fig. 2 is a diagrammatic plan view of the arrangement of the shock absorbers in a vehicle, showing the relative displacements of the pendulums in full lines when the vehicle is slowing down or stopping, and in the dotted lines when the vehicle is starting or increasing its speed, Fig. 3 is a similar view showing the displacements of the pendulums in full lines when the vehicle is turning to the left, and in dotted lines when it is turning to the right, Fig. 4 is a sectional plan view through the top of the cylindrical casing on the shock absorber taken on the line 4—4 of Fig. 1, Figs. 5 and 6 are sectional plan views through the shock absorber and suspension spring taken on the lines 5—5 and 6—6 of Fig. 1, respectively, Fig. 7 is an enlarged sectional detail view taken on the line 7—7 in Fig. 5, Fig. 8 is a modified form of vented relief valve in the upper wall of the shock absorber fluid chamber, Fig. 9 is an enlarged detail view of the modified relief valve taken on the line 9—9 of Fig. 8, and Fig. 10 illustrates a bump in the road and the path of the tire over it under different damping of the corresponding shock absorber.

Referring to Fig. 1, the basic structure of the fluid shock absorber shown may be a double acting piston 10 reciprocable in the fluid cylinder 11 to displace the fluid from one side of the piston to the other. A flow passage 12 on the outside of cylinder 11 is connected to the outer ends of the cylinder chambers on opposite sides of the piston 10 through check valves 13 and 14, to provide substantially unrestricted flow in one direction only, i. e. from the upper chamber to the lower one, in a closed fluid system.

Piston 10 has a piston rod 15 extending through the bottom of the lower chamber and is connected to the lower end of the coil spring 16 which is connected to the unsprung undercarriage or wheel axle support 17, the upper end of the spring being fixed to the body of the shock absorber, for supporting the sprung weight or body of the vehicle 18. The piston rod packing joint includes external wiper rings 19 around the rod for low friction, long wear, and minimum leakage of the hydraulic fluid.

The piston may be provided with a vented check valve 20 having a vent 21 for normally bleeding the fluid from one side of the piston to the other to damp the piston more on its upstroke than downstroke when fluid flow through passage 12 is restricted by closure of valve 29, but when valve 29 is fully open, the piston is damped less on its upstroke than downstroke. This is so because valves 13 and 14 can open fully, allowing fluid to move from 25 freely through 12 when piston moves up. On downstroke of piston, valves 13 and 14 close so that flow can only be through open valve 20 which is not as great as was the flow through open valves 13 and 14 when piston moved up.

The check valve 20 opens in response to sudden downward motion of the unsprung weight 17, as when the wheel falls into a depression in the road. A relief valve 22 may be provided in the upper end wall 23 of the cylinder 11 for relieving some of the fluid from the closed fluid system which is displaced by the piston rod as it moves inwardly of the cylinder 11. The spring 24 in the relief valve is very strong, so as to maintain sufficient snubbing pressure in the upper chamber 25 of the cylinder when needed. Small bleed grooves 26 may be provided in the seat of the valve 22 for normal slow passage of the fluid into and out of the cylinder 11 in accordance with the corresponding movement of rod 15 therein. A fluid reservoir if formed above the wall 23 by a cylindrical casing 27 which encloses an automatic inertia responsive pendulum control means 28 for controlling a gate valve 29 to restrict the flow of the hydraulic fluid from chamber 25 into the passage 12 through check valve 13.

Valve 29 has a stem 30 of small cross-section passing through the end wall 23 to reduce the effect of the transmission of hydraulic forces on the operation of the pendulum control means 28, which comprises a pendulum lever 31 having the pendulum weight 32 at its upper end and a cam disc 33 at its lower end, and is universally mounted at 34 in bearing support bracket 35 fixed to the walls of the cylindrical casing 27. Cam disc 33 has a convexly curved lower cam face for cooperation with the top of the valve stem for gradually closing the valve 29 as the lever 31 moves from its normal vertical position in any direction. The pendulum lever 31 is resiliently held in its normal vertical position by a light spring 36. An additional spring 37 may be connected between the wall casing 27 and the upper end of lever 31, to compensate for the effect of gravity, of the weight 32 at the more displaced positions of the lever 31, on the operation of the control means 28. Spring 37 may be of a length to take effect after a displacement of the lever 31 of about 20°, when the gravity force component on the controls becomes significant.

A modified form of valve which may be used in the end wall 23, is shown in Figs. 8 and 9. A ball 38 is loosely held in the valve guide channel 39 leading to a port 40 in wall 23 having a valve seat 41 for the ball 38 with bleed grooves 42, for providing restricted relief and return of the fluid to and from the reservoir above wall 23.

Thus, it will be evident that while these shock absorbers, under normal straight line travel at constant speed, will improve ridability and roadability as affected by the roughness of the road surface in their normal shock absorbing operation, they will also improve the same qualities as affected by horizontal inertia effects on the body of the vehicle, such as may be due to starting, stopping or turning.

This is made possible by the addition of the valve 29 and its control means, and placing one of these shock absorbers at each corner or wheel of the vehicle with the excentricity of the mounting of each universal pendulum bearing 34 in the cylindrical casing 27 turned diagonally toward the center of the vehicle.

As shown in Fig. 2, any stopping or slowing down, as well as any starting or acceleration in reverse which would normally tend to cause "diving" of the front end of the vehicle, will cause the pendulums in the front shock absorbers to restrict the openings of their valves 29, while the pendulums in the rear shock absorbers will not restrict their valves 29 as much but some negligible restriction may result due to the very limited clearance of these pendulums from the wall 27 in the corresponding direction, as shown in full lines in this figure. The tendency to "dive" will consequently be immediately substantially damped out.

The opposite maneuvers, such as starting or accelerating forwardly, as well as slowing down or stopping while moving in reverse, which would normally cause "squatting" or lowering of the rear end of the vehicle, will cause the pendulums to take the dotted line positions indicated in Figure 2. This will immediately substantially damp out the squatting tendency.

Figure 3 similarly shows in full line the positions of the pendulums caused by turning to the left, and in dotted lines the positions of the pendulums caused by turning to the right. The inside pendulums will swing less, but will cause a little damping of upward piston movement to help traction.

Figure 10 shows the line A—A representing a bump in the road. Dotted line B shows the path of the tire portion nearest the road when the pendulum is in a vertical position, thus allowing undamped action of piston which in turn lets unsprung weight continue its rise above crest of bump due to inertia or kinetic energy of said unsprung weight. This would also represent the comparatively free action of the springs to absorb the upward shocks instead of transmitting them to the sprung weight during constant speed straight line travel, thus producing better ridability.

Dotted line C shows path of the tire portion nearest the road when pendulum is not in a vertical position due to acceleration, deceleration, or turning, thus damping the upward movement of piston to retard unsprung weight in its rise over bump and resulting in better traction or roadability. It is also evident that this mentioned upward damping will transmit the force to the sprung weight with some detrimental effects on ridability. The said detrimental effects are always present in conventional systems, especially noticed as shocks to steering wheel seats and floor board when passing over minor abrupt elevations. Since most travel could be represented by line B, a good ride is assured most of the time when roadability is not needed. Line C represents a minor part of travel when good roadability automatically assures safety.

In all these cases, the steadying effect of the damping means being instantly responsive, may be made to prevent the abnormal oscillations or displacements of the body of the vehicle with respect to its undercarriage, and will thus minimize the detrimental effects of horizontal accelerations on ridability as well as roadability of the vehicle.

Many obvious modifications in the details and arrangement of parts of the devices here disclosed may be made without departing from the spirit and scope of the present invention, as defined in the appended claims.

What is claimed is:

1. A fluid shock absorber adapted for vertical suspension between each corner portion of a resiliently suspended vehicle body and its unsprung undercarriage for damping vertical rebound of said body caused by normal travel over uneven road beds, each of said shock absorbers having a double-acting piston and a closed fluid system providing flow between opposite sides of said piston and including a by-pass passage around said piston and a check valve in said passage providing unrestricted flow into said passage from one side of said piston and preventing reverse flow, the inlet end of said passage having a normally unrestricted port, port restricting valve means for said normally unrestricted port, a universally mounted lever having a disc shaped cam at its lower end for operating said port restricting valve means and having a weight at its upper end, a light coil spring vertically mounted around said upper end and biased against the bottom of the weight to sensitively balance it in a vertical position over said universal mounting, said valve operating means being thus automatically responsive to horizontal accelerations of said vehicle to increase said restriction in accordance with the degree of acceleration, and stop means for said weight to limit its movement in the direction inwardly of said vehicle body, whereby to reduce dive, squat and sway of said vehicle such as caused by stopping, starting and turning, respectively.

2. In a hydraulic shock absorber adapted for vertical suspension between the sprung and unsprung masses of a vehicle, a cylinder adapted for connection to one of said masses, a piston operating therein and having a piston rod adapted for connection to the other of said masses, a normally unrestricted port in the end of said cylinder farthest removed from the connection to said other mass, valve means for restricting said port, and horizontally responsive inertia means fixed to one end of a universally mounted lever for controlling said valve means operative to restrict said port in accordance with horizontal accelerations of said vehicle, and stop means for said inertia means to limit its movement in the direction substantially inwardly of said vehicle.

3. The combination defined in claim 2, wherein said valve means includes a valve having a valve stem extending vertically through the top of said cylinder, and resilient means for normally biasing said valve into fully open position, and said control means includes a cam disc fixed to the other end of said universally mounted lever adjacent the end of said valve stem, said cam disc having a convex cam surface of relatively large radius, said lever having means for normally biasing it into inoperative position extending axially of said cylinder.

4. The combination defined in claim 3, a protective cylindrical casing mounted on the end of said cylinder enclosing said inertia means and having its axis displaced from said mounting to provide said limiting means, the cylindrical wall portion of the casing nearest said mounting forming said stop means for limiting the displacement of said inertia means toward it.

5. The combination defined in claim 4, said cylinder being adapted for connection to the sprung mass placing the weight of the inertia means uppermost on the upper end of said lever, and a spring loosely connected between said cylindrical wall portion and said weight for compensating the effect of gravity of said weight on said control means at significantly large displacement angles of said lever.

6. The combination defined in claim 5, and a bleed opening in the top of the hydraulic cylinder for the liquid to relieve excessive pressures in said cylinder and to supply liquid from the overflow reservoir formed by said casing to normally maintain said cylinder filled.

7. The combination defined in claim 6, said piston being a double acting piston having a piston rod extending through the chamber at one end of the cylinder, an external passage connected to opposite ends of said cylinder, said normally unrestricted port leading from the upper end of the cylinder to the upper end of said passage, check valves at the ends of said passage providing free downward flow therethrough and preventing reverse flow, and a restricted passage in said piston to damp its downward movement in said cylinder.

8. The combination defined in claim 7, a pressure relief valve in said piston for relieving high pressures in the lower chamber of the cylinder when the unsprung mass falls into a sudden depression, said restricted passage being in said relief valve.

9. The combination defined in claim 8, said normally unrestricted port being wide and low and said controlled valve being a correspondingly wide gate valve having a short stroke to provide a sensitive control in response to the swinging of the disc cam on the weighted lever.

10. The combination defined in claim 9, and a filler cap in the wall of said cylindrical enclosure.

References Cited in the file of this patent

UNITED STATES PATENTS

| | | |
|---|---|---|
| 1,419,430 | Wheatley | June 13, 1922 |
| 1,976,951 | Lombard | Oct. 16, 1934 |
| 2,048,037 | Smith | July 21, 1936 |
| 2,067,640 | Madden | Jan. 12, 1937 |
| 2,144,583 | Focht | Jan. 17, 1939 |
| 2,452,885 | Willard | Nov. 2, 1948 |
| 2,678,704 | Campeau | May 18, 1954 |
| 2,722,288 | Steinbauer | Nov. 1, 1955 |
| 2,802,675 | Ross | Aug. 13, 1957 |